(12) United States Patent
Sahoo et al.

(10) Patent No.: US 12,450,535 B2
(45) Date of Patent: Oct. 21, 2025

(54) MULTI-LAYER MICRO MODEL ANALYTICS FRAMEWORK IN INFORMATION PROCESSING SYSTEM

(71) Applicant: Dell Products L.P., Round Rock, TX (US)

(72) Inventors: Sujit Kumar Sahoo, Bangalore (IN); Dhilip S. Kumar, Bangalore (IN); Ajay Maikhuri, Bangalore (IN); Devaraj Marappa, Krishnagiri District (IN)

(73) Assignee: Dell Products L.P., Round Rock, TX (US)

(*) Notice: Subject to any disclaimer, the term of this patent is extended or adjusted under 35 U.S.C. 154(b) by 310 days.

(21) Appl. No.: 17/969,827

(22) Filed: Oct. 20, 2022

(65) Prior Publication Data

US 2024/0135283 A1 Apr. 25, 2024
US 2024/0232754 A9 Jul. 11, 2024

(51) Int. Cl.
*G06F 40/40* (2020.01)
*G06N 3/04* (2023.01)
*G06Q 10/0631* (2023.01)

(52) U.S. Cl.
CPC ....... *G06Q 10/06315* (2013.01); *G06F 40/40* (2020.01); *G06N 3/04* (2013.01)

(58) Field of Classification Search
CPC ........... G06Q 2220/00; G06Q 10/0633; G06Q 10/06315; G06Q 30/0201; G06Q 30/0202; G06Q 50/01; G06N 20/00; G06N 3/08; G06N 3/04; G06N 3/045; G06N 5/04; G06F 40/40; G06F 16/2455; G06F 16/217; G06F 18/285; G06F 40/30
See application file for complete search history.

(56) References Cited

U.S. PATENT DOCUMENTS

2020/0337625 A1\* 10/2020 Aimone ................ A61B 5/7267
2021/0353224 A1\* 11/2021 Etkin ..................... G16H 50/70

OTHER PUBLICATIONS

C. Marshall, "What Is Intent Recognition and How Can I Use It?" https://medium.com/mysuperai/what-is-intent-recognition-and-how-can-i-use-it-9ceb35055c4f, Aug. 31, 2020, 5 pages.
Wikipedia, "Sentiment Analysis," https://en.wikipedia.org/w/index.php?title=Sentiment_analysis&oldid=1099109657, Jul. 19, 2022, 16 pages.

(Continued)

*Primary Examiner* — Jakieda R Jackson
(74) *Attorney, Agent, or Firm* — Ryan, Mason & Lewis, LLP

(57) ABSTRACT

Techniques are disclosed for a multi-layer micro model analytics framework for analyzing or otherwise processing data. For example, a method comprises building two or more micro models respectively for two or more stages of a given process, wherein each micro model of the two or more micro models comprises a user interaction layer and a predictive learning layer that coordinate to train the micro model based on input to the user interaction layer and data accessible by the predictive learning layer for the corresponding stage of the two or more stages of the given process. The method then assembles the two or more micro models to perform analysis for the given process. In one non-limiting example, the given process is a new product introduction process and each micro model is built and trained to perform analytics for a specific lifecycle stage of the process.

20 Claims, 9 Drawing Sheets

(56) References Cited

OTHER PUBLICATIONS

Wikipedia, "Speech Recognition," https://en.wikipedia.org/wiki/Speech_recognition, Jul. 5, 2022, 19 pages.
Wikipedia, "Random Forest," https://en.wikipedia.org/wiki/Random_forest, Jun. 20, 2022, 10 pages.
Wikipedia, "Bidirectional Recurrent Neural Networks," https://en.wikipedia.org/wiki/Bidirectional_recurrent_neural_networks, May 3, 2022, 2 pages.
Wikipedia, "Long Short-term Memory," https://en.wikipedia.org/wiki/Long_short-term_memory, Jul. 20, 2022, 10 pages.
U.S. Appl. No. 17/870,942 filed in the name of Dhilip S. Kumar et al. Jul. 22, 2022, and entitled "Domain-Driven Feedback Data Analysis in Information Processing System."

* cited by examiner

500

600

700

800

900

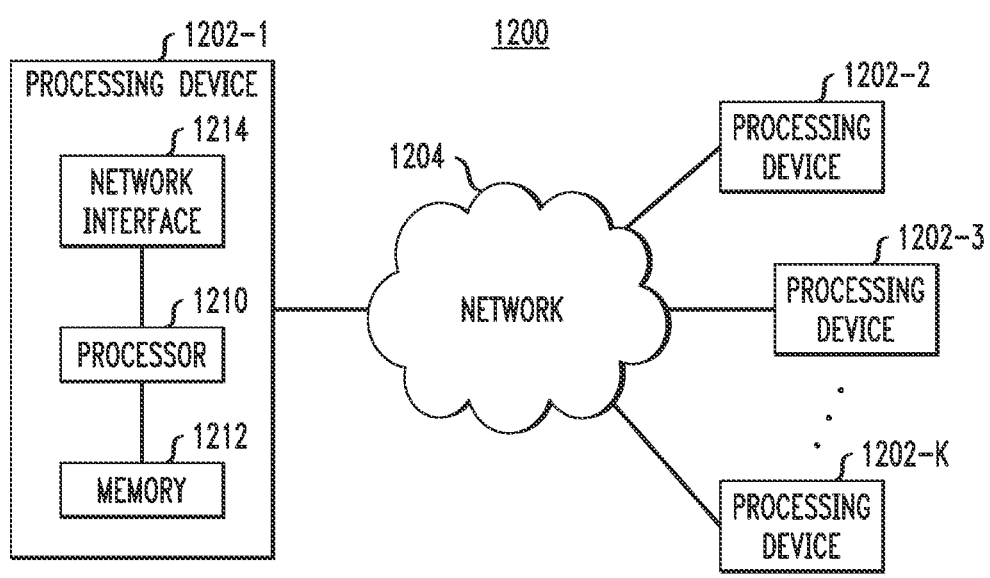

MULTI-LAYER MICRO MODEL ANALYTICS FRAMEWORK IN INFORMATION PROCESSING SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Field

The field relates generally to information processing systems, and more particularly to data analysis in such information processing systems.

BACKGROUND

Information processing systems associated with enterprises can be configured to analyze data for the purpose of adapting the information processing systems and/or one or more other aspects of the enterprises. It is realized that while, historically, these analyses were done manually by a subject matter expertise, data analyst, and/or data engineers of an enterprise, artificial intelligence/machine learning (AI/ML) techniques have taken over a significant portion of analytics processes in the world today.

However, existing approaches typically utilize a stand-alone or monolithic AI model to provide analytical results on a large set of enterprise data. Such a monolithic AI model typically fails to effectively learn detailed features associated with an analytical task, since it is configured to automatically operate only on broader features of the analytical task. Enterprises therefore have to rebuild and redeploy the model each time some new behavior is to be analyzed. This can have a significant negative impact on the underlying information processing system used to execute the AI model, for example, in terms of extra operational burdens on computational resources (e.g., more compute cycles needed), storage resources (e.g., more storage units needed), and/or network resources (e.g., more network traffic needed).

SUMMARY

Embodiments provide a multi-layer micro model analytics framework for analyzing or otherwise processing data.

For example, according to one illustrative embodiment, a method comprises building two or more micro models respectively for two or more stages of a given process, wherein each micro model of the two or more micro models comprises a user interaction layer and a predictive learning layer that coordinate to train the micro model based on input to the user interaction layer and data accessible by the predictive learning layer for the corresponding stage of the two or more stages of the given process. The method then assembles the two or more micro models to perform analysis for the given process.

Further illustrative embodiments are provided in the form of a non-transitory computer-readable storage medium having embodied therein executable program code that when executed by a processor causes the processor to perform the above steps. Additional illustrative embodiments comprise an apparatus with a processor and a memory configured to perform the above steps.

Advantageously, a multi-layer micro model analytics framework according to illustrative embodiments improves underlying information processing systems used to execute AI models compared with the existing monolithic AI model approach by, inter alia, eliminating and/or reducing extra operational burdens on computational resources (e.g., eliminate/reduce compute cycles), storage resources (e.g., eliminate/reduce storage units), and/or network resources (e.g., eliminate/reduce network traffic) by eliminating/reducing a need to rebuild and redeploy the AI model. In one illustrative embodiment, the given process is a new product introduction (NPI) process and each micro model is built and trained to perform analytics for a specific lifecycle stage of the NPI process.

These and other features and advantages of embodiments described herein will become more apparent from the accompanying drawings and the following detailed description.

BRIEF DESCRIPTION OF THE DRAWINGS

FIG. 12 illustrates a processing platform for an information processing system used to implement a multi-layer micro model analytics system according to an illustrative embodiment.

DETAILED DESCRIPTION

Figure 1:
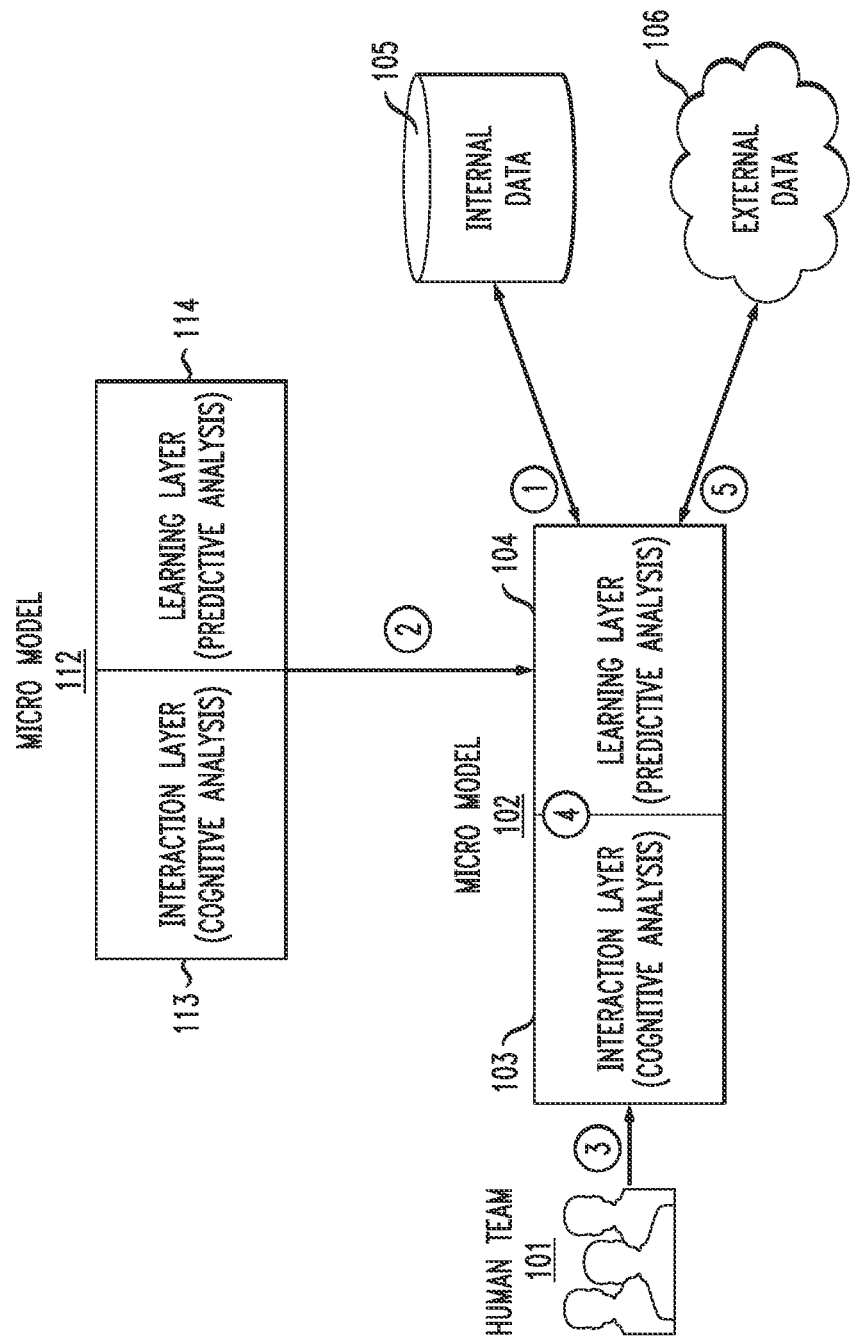
FIG. 1 illustrates a multi-layer micro model analytics process according to an illustrative embodiment.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

One non-limiting example of a scenario where an enterprise may use an information processing system to analyze data is in the case of a new product introduction (NPI). NPI is a process that takes an idea from an initial working prototype to a refined and reproducible final product. Since NPI requires a substantial investment of time and resources, careful planning goes into each step to ensure that the result will be worth the effort. The lifecycle stages of the NPI process are followed industry-wide, and they are broadly categorized into discovery (concept/ideation), development (define, plan, develop), and delivery (launch). However, the NPI process within these broad categories are based on each enterprise's needs.

Enterprises attempt to analyze product demand and product supply aspects at each stage of the NPI process. For example, analysis of product demand aspects may include consideration of: (i) product features that will create impact; (ii) industry problem statement/concerns/grievance; (iii) future customer expectations; and (iv) demand preference by region and culture. Further, analysis of product supply aspects may include consideration of: (i) a vendor base of parts to build the product; (ii) performance of the parts based on previous feedback; and (iii) vendor supply availability across regions. In existing approaches, these analyses are typically performed by one or more subject matter experts (SMEs), data analysts, and/or data engineers manually scanning market studies.

It is realized that artificial intelligence/machine learning (AI/ML) is playing an increasing role in a significant portion of processes today and, as such, enterprises may attempt to leverage the innumerable facets of AWL in launching new products or in the NPI process. However, it is further realized that simply relying on traditional monolithic data gathering and monolithic AI models to determine the overall NPI process is not sufficient. By monolithic AI model, it is illustratively meant that the AI model is silo-inducing with respect to data and results given its standalone nature. Further, monolithic may also illustratively refer to the inability of a single AI model to effectively analyze detailed aspects of a complex analytical task. Note that without loss of generality or specificity, as illustratively used herein, the term AI model (application, algorithm, etc.) may also comprise ML functionalities and/or the like depending on the specific use case to which the model is applied. Likewise, the term machine learning may be used synonymously with the term AI and the like.

A main challenge for the NPI process is to evolve a product (produce a new product or modify/add a new feature to the existing product) from concept to final form to gain customer satisfaction or otherwise meet customer expectations. To achieve such results, enterprises typically apply long-term methods such as investing in more manufacturing plants, more machines, more resources, etc., as well as short-term methods to analyze the market in the respective domain and the expected demand and supply capacity. These analyses start small, but they can become complex over time, yielding inaccurate results.

An evolving NPI application based on an AI model can be trained using historical behavior, market trends, customer behavior, and consumption behavior. The AI model is built on input and expected output. However, such monolithic AI model approach lacks flexibility in terms of adding new dynamics to learn about detailed steps in the NPI process and to add unique attributes to the existing model. Model maintenance therefore becomes a complex technical challenge for the underlying information processing system that is implementing the AI application. For example, an AI model trained to provide an output based on a fixed setoff input is not interactive and fails to act on real-time situational data. Moreover, existing models are trained using historical events, and thus typically are trained only based on past failures.

Illustrative embodiments overcome the above and other drawbacks associated with existing approaches by providing a multi-layer micro model analytics framework (e.g., system, process, etc.). In the context of a non-limiting use case such as NPI, illustrative embodiments enable an interactive, dynamic, flexible NPI cohort analysis system that uses a two-layered micro (AI) model approach. For example, in one or more illustrative embodiments, the two layers comprise a cognitive analytics layer (interaction layer) that interacts with the NPI team of the enterprise, and a predictive analytics layer (learning layer) that learns and is trained from one or more connected data sources. Thus, the interaction layer and predictive layer operate as a "cohort" (e.g., group with one or more common purposes or functions) for a particular NPI analytical task. It is to be understood that while some illustrative embodiments herein will be described in the context of an NPI use case, alternative embodiments may implement multi-layer micro model analytics functionalities in a wide variety of other use cases.

FIG. 1 illustrates a multi-layer micro model analytics process 100 according to an illustrative embodiment. As shown, a micro model 102 comprises two processing layers, i.e., an interaction layer 103 and a learning layer 104. Micro model 102 is therefore considered a multi-layer micro model. As will be further explained, interaction layer 103 is configured to provide, inter alia, a human-machine interface with cognitive analysis of human input, while learning layer 104 is configured to provide, inter alia, a machine-machine interface with predictive analysis for model training based at least in part on one or more sources (internal and/or external to the enterprise). More particularly, human team 101 (e.g., enterprise personnel such as an NPI team) interacts with interaction layer 103, while internal data source 105 and external data source 106 serve as sources for training micro model 102 via learning layer 104.

Further, as also shown, another micro model 112 comprises two processing layers, i.e., an interaction layer 113 and a learning layer 114 configured similarly to interaction layer 103 and a learning layer 104. Micro model 112 is therefore also considered a multi-layer micro model. Micro model 112 provides input to learning layer 104 of micro model 102, as will be further explained. For example, consistent with the use case in which multi-layer micro model analytics process 100 is implemented, micro model 112 analyzes one part of an overall analytical task, and provides results as input to micro model 102 which analyzes another part of the overall analytical task. Accordingly, multi-layer micro model analytics process 100 sequentially assembles two or more micro models (e.g., 102 and 112 here, but can be any larger number of micro models) to operate in an environment that is dynamic with changing input conditions and real-time operational scenarios. Collectively, the multiple micro models 102 and 112 function as a multi-dimensional and independent AI model with the significant advantage that each micro model is trained to analyze a particular detailed part of an overall analytical task. For example, in an NPI use case, one or more micro models can be used for a discovery task (concept/ideation), another one or more micro models for a development task (define, plan, develop), and another one or more micro models for a delivery task (launch). Recall that these tasks correspond to the lifecycle stages (e.g., product conception through product launch) of the NPI process. This is depicted in FIG. 2.

Figure 2:
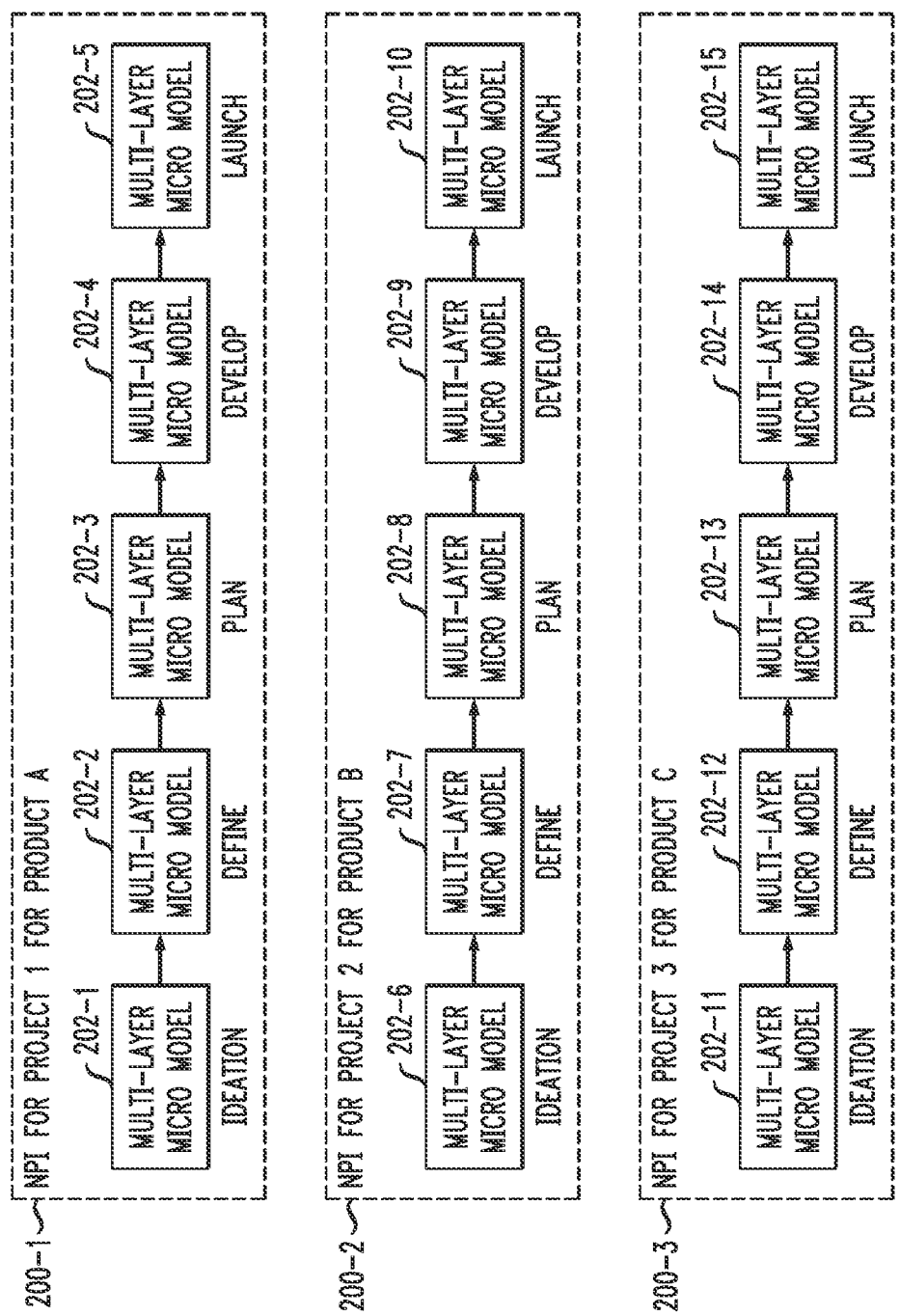
FIG. 2 illustrates an example use case of a multi-layer micro model analytics process according to an illustrative embodiment.

More particularly, FIG. 2 illustrates an example NPI use case using a multi-layer micro model analytics process according to an illustrative embodiment. Assume an enterprise has designated specific projects 1, 2, and 3 for multiple new products A, B, and C being introduced. A multi-layer micro model analytics process according to an illustrative embodiment can be used to assemble AI models for the overall NPI analysis. Thus, as shown, for project 1 of product A, assembled AI model 200-1 comprises a (multi-layer) micro model 202-1 for an ideation task, which provides input to a micro model 202-2 for a define task, which provides input to a micro model 202-3 for a plan task, which provides input to a micro model 202-4 for a develop task, which provides input to a micro model 202-5 for an launch task. Similarly, for project 2 of product B, assembled AI model 200-2 comprises a (multi-layer) micro model 202-6 for an ideation task, which provides input to a micro model 202-7 for a define task, which provides input to a micro model 202-8 for a plan task, which provides input to a micro model 202-9 for a develop task, which provides input to a micro model 202-10 for an launch task. Lastly, for project 3 of product C, assembled AI model 200-3 comprises a (multi-layer) micro model 202-11 for an ideation task, which provides input to a micro model 202-12 for a define task, which provides input to a micro model 202-13 for a plan task, which provides input to a micro model 202-14 for a develop task, which provides input to a micro model 202-15 for an launch task.

Accordingly, rather than a monolithic AI model being trained for the entire NPI lifecycle (i.e., the same singular model for all stages of NPI, as in existing approaches), illustrative embodiments provide for a smaller (micro) model for an individual stage such that the collection of micro models operate together as an assembled AI model (e.g., as in the FIG. 2 embodiments) to realize an NPI lifecycle. Given that the micro models are assembled for each project and that projects can execute in parallel, as depicted in FIG. 2, the core elements needed for an improved (e.g., optimized) NPI at every stage are predicted. This results in a more flexible NPI process that can accommodate dynamic change in a global industry, customer needs, and/or a supply base.

In some embodiments, an ideation task (conceptualization/discovery) may comprise one or more of the following analyses: (i) obtaining a product feature from a marketing team; (ii) identifying how to differentiate the product feature from competitors; (iii) identifying a target audience; (iv) determining if there is a strong need for the product feature with customers; (v) computing a potential volume of the market; and (vi) conducting a survey of test set of products with the potential feature to determine whether it is worth going ahead with a planned NPI; and (vii) validating features from industry trends and provide recommendations based on sentiments on those features; and (viii) geographic-based analysis (e.g., climate, volume, culture).

In some embodiments, a define task (product definition as part of development stage) may comprise one or more of the following analyses: (i) exploring features and conceptualizing the bill of materials (BOM); (ii) determining sentiments from market feedback on components; (iii) determining historical support experience from services (e.g., whether any components had issues in the past or whether a component from a specific supplier had a problem); and (iv) determining geographic-based experiences.

In some embodiments, a plan task (engineering design as part of development stage) may comprise one or more of the following analyses: (i) obtaining requests for quotation (RFQs) from vendors; (ii) exploring features and conceptualizing the bill of materials (BOM); (iii) determining sentiments from market feedback on components; (iv) determining historical support experience from services; and (v) determining geographic-based experiences.

In some embodiments, a develop task (as part of development stage) may comprise one or more of the following analyses: (i) vendor analysis and award; (ii) exploring features and conceptualizing the bill of materials (BOM); (iii) determining sentiments from market feedback on components; (iv) determining historical support experience from services; and (v) determining geographic-based experiences.

In some embodiments, a launch task may comprise one or more of the following analyses: (i) determining a market strategy; (ii) determining a regional launch strategy; and (iii) obtaining orders from customers.

It is to be understood that the data for each of the above NPI tasks can be collected from one or more sources, internal and/or external to the enterprise. Also, one or more earlier stages of the NPI process provide data for one or more subsequent stages.

Recall, as shown in FIG. 1, each of micro models 102 and 112 is a multi-layer AI model with an interaction layer (103 and 113) for performing cognitive analytics and a learning layer (104 and 114) for performing predictive analytics. Each micro model gathers the relevant data as needed to perform its particular analysis for the given NPI stage. For example, micro model 102 gathers relevant data from internal data source 105 and/or external data source 106, as well as receiving human input, e.g., in the form of a query and/or statement. Given the data and other input gathering, micro model 102 then cooperatively executes cognitive analytics (interaction layer 103) and predictive analytics (learning layer 104). In predictive analytics, relevant data sources needed for the NPI process in each stage/step are accessed since each step/stage may need a unique data set and preparation method. Each stage/step in the NPI process is trained with respective domain data. One micro model (102) can interact with its connected micro model (112) in the chain to learn about the subject in detail. Each stage/step learns the data continuously and generates recommendations and details about its respective task. In cognitive analytics, this is a human interaction layer where an NLP-based interface detects aspects, opinions, and sentiments of enterprise personnel (human team 101) from inputs received therefrom.

The overall combination of the two layers of analytics within the multiple micro models enable continuous training (learning) based on current market trends and available data attributes for a given enterprise/domain. The micro models are clustered/assembled for a given project/product in the environment that enables intelligent execution of the NPI process, and then the micro models can be disassembled upon project completion and return to further training/learning. It is to be appreciated that the terms training and learning as illustratively used herein may be used interchangeably.

More particularly, as depicted in FIG. 1 by the enumerated circles, operation of micro model 102 occurs as follows. In step 1, learning layer 104 interacts with internal data source 105 and external data source 106 to train on the relevant subject. In step 2, learning occurs from the previous micro model (112) when these micro-models were assembled for the project. In step 3, the NPI team (human team 101) interacts with interaction layer 103 to seek information. In step 4, interaction layer 103 connects with learning layer 104 to determine any needed information. In the case where information is available, the information is returned; otherwise, micro model 102 proceeds to step 5. In step 5, learning layer 104 searches for more information on the corresponding internal data source 105 and external data source 106 and produces results.

Figure 3:
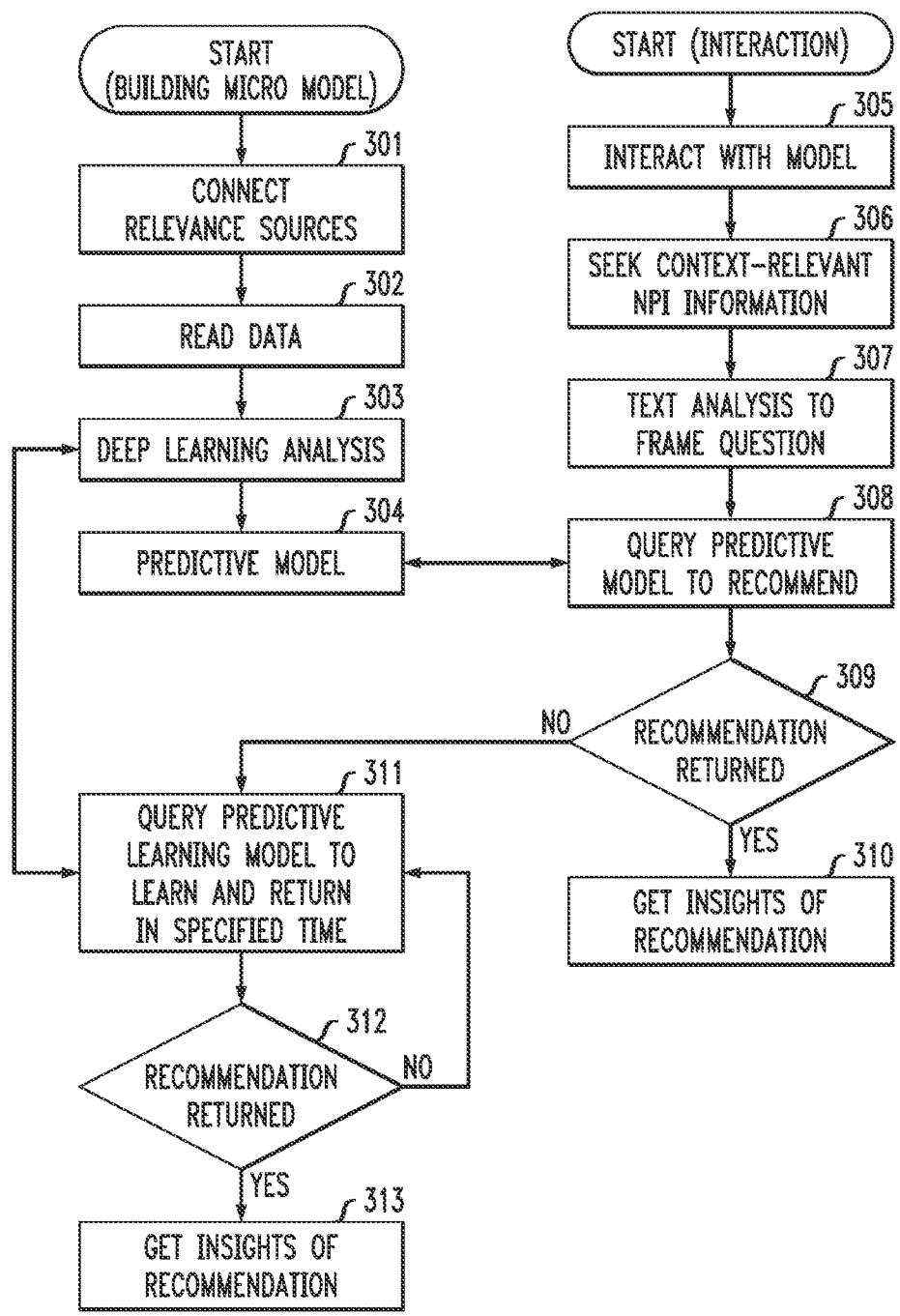
FIG. 3 illustrates a micro model building and training methodology for a multi-layer micro model analytics process according to an illustrative embodiment.

Referring now to FIG. 3, a methodology 300 is shown for building and training a micro model for use in a multi-layer micro model analytics process according to an illustrative embodiment. For example, in some illustrative embodiments, methodology 300 can be executed to form micro model 102 of FIG. 1. However, it is understood that methodology 300 can be used to build and train each micro model used in a sequence of connected micro models.

More particularly, methodology 300 builds and trains a predictive model which is part of learning layer 104 and that is used by the NPI team for predicting answers to NPI queries entered by the team.

Step 301 connects all relevant sources (e.g., internal data source 105 and external data source 106) based on model context (e.g., concept/ideation, define/product definition, plan/engineering design, develop, launch (ready to ship)).

Step 302 reads the data from the relevant sources.

Step 303 performs a natural language deep analysis on the relevant data to prepare the relevant data.

Step 304 performs model learning to create a predictive model using analyzed data and prepares all related information.

Interaction begins in step 305 with the NPI team (human team 101) interacting with the interaction layer 103 of the micro model for their respective context.

Step 306, interaction layer 103 seeks context-relevant NPI information from learning layer 104.

Step 307 performs text analysis on the context-relevant NPI information to frame a question for the predictive model.

Step 308 connects with the predictive model (step 304) to ask the question. The predictive model returns all relevant answers (recommendations) based on the question.

Step 309 checks whether or not the model returned the data.

If yes, then methodology 300 follows the recommendation (get the insight) in step 310.

If not, then methodology 300 asks the model to further train in step 311. For example, methodology 300 retriggers the model to learn and ask the model to return once ready or in a specified time.

Step 312 checks whether or not the model returned the data.

If yes, then methodology 300 follows the recommendation (get the insight) in step 313. If not, then methodology 300 asks the model to further train in step 311.

Methodology 300 thus iterates to provide continuous training/learning for the micro model as needed for a specific query for this stage of the NPI process.

Figure 4:
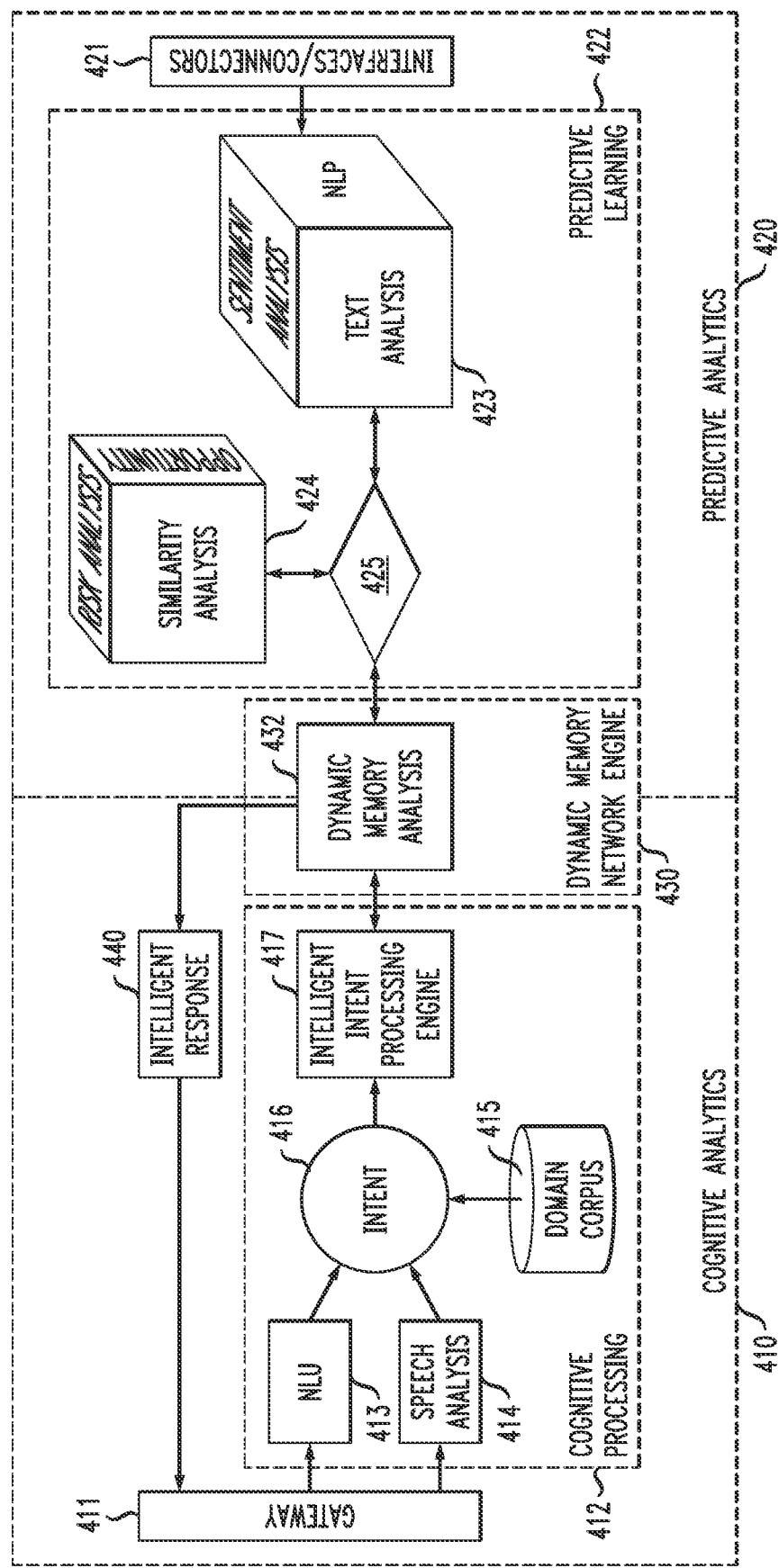
FIG. 4 illustrates a multi-layer micro model analytics system according to an illustrative embodiment.

Turning now to FIG. 4, a multi-layer micro model analytics system 400 according to an illustrative embodiment is illustrated. More particularly, multi-layer micro model analytics system 400 can be configured to implement the above-defined flow of methodology 300.

As shown, multi-layer micro model analytics system 400 comprises a cognitive analytics module 410 and a predictive analytics module 420 operatively coupled by a dynamic memory network engine 430. Cognitive analytics module 410 comprises a gateway 411 operatively coupled to a cognitive processing module 412 which, itself, comprises a natural language understanding (NLU) module 413, a speech analysis module 414, a domain corpus 415, an intent determination 416, and an intelligent intent processing engine 417. Predictive analytics module 420 comprises interfaces/connectors 421 and a predictive learning module 422 which, itself, comprises a first analysis module 423, a second analysis module 424, and a combiner 425. Multi-layer micro model analytics system 400 produces an intelligent response 440 as will be further explained in detail below.

Note that in multi-layer micro model analytics system 400, cognitive analytics module 410 and predictive analytics module 420 respectively correspond to interaction layer 103 and learning layer 104 of FIG. 1. In an illustrative NPI use case, such a combined cognitive and predictive model combines a set of machine learning algorithms connected to arrive at an intelligent response (i.e., predicted answer) to an NPI team input at every stage of the NPI lifecycle. As will be explained, in an illustrative embodiment, cognitive analytics module 410 identifies intent while interacting with the NPI team, while predictive analytics module 420 learns sentiment with context-based opinion mining, computes a Euclidean distance metric for matching features/components/suppliers for the NPI, and performs an opportunity analysis with risk. Dynamic memory network engine 430 with memory and attention mechanisms constructs a query (e.g., optimal question) and determines an intelligent response (e.g., optimal answer) for the NPI team.

Starting with predictive analytics module 420, first analysis module 423 provides a combination of NLP, sentiment and text analysis, as will be explained. A fundamental task in natural language processing and computational linguistics is sentiment analysis, also known as context-based opinion mining, to arrive at a sentiment polarity. The sentiment analysis is important in understanding user-generated text in forums, blogs, microblogs, and research papers. The target-dependent sentiment classification is a type of sentiment analysis. In each sentence and a given target, the task calls for inferring the sentiment polarity (e.g., positive, negative, neutral) of the sentence towards a given target. Target-dependent sentiment classification is typically regarded as a text classification problem.

Second analysis module 424 provides a combination of similarity, opportunity and risk analysis as will be explained. A similarity metric in the form of a Euclidean distance is responsible for data matching, e.g., matching a new feature/component/supplier with an existing feature/component/supplier. This leverages multi-dimensional features of the new idea/plan/design and utilizes a distance-based machine learning algorithm to match the features/components/suppliers. It is realized that a context opportunity analysis with risk consideration can be a key factor in a modern supply chain that enables globalization with a vast amount of information management to integrate suppliers worldwide. The risk consideration can account for, inter alia, new challenges, regional differences such as taxes, exchange rates, geopolitical issues, and potential natural disasters add complexity to global supply networks. It is realized that these events increase the difficulty of maintaining a robust/ resilient global supply chain. Therefore, understanding regional risks is important in global supply chain management.

It is realized that humans do not start their thinking from scratch every second. As one reads an essay, a person understands each word based on an understanding of previous words. One will naturally look at parts of relevant context words, which are helpful to determine the sentiment polarity of a sentence towards the target. Accordingly, illustrative embodiments propose a robust recurrent neural network approach with target dependent long short-term memory (TD-LSTM) networks, which can learn continuous features (representations) without feature engineering while capturing the intricate relatedness among target, context, and dependent words.

Figure 5:
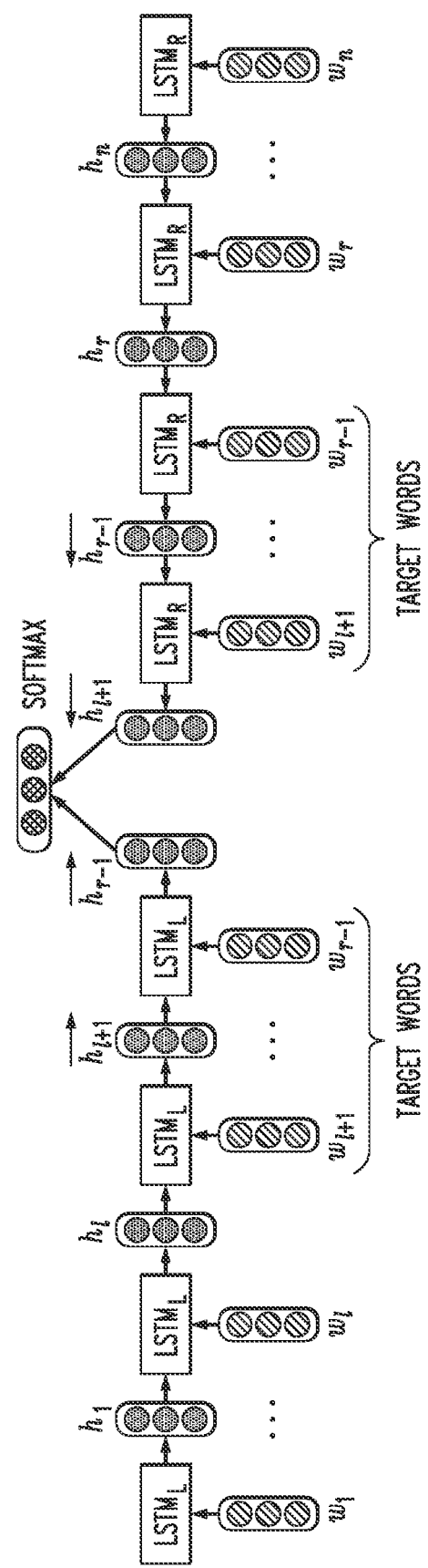
FIG. 5 illustrates a semantic analysis network for use in a multi-layer micro model analytics system according to an illustrative embodiment.

FIG. 5 illustrates a TD-LSTM network 500 which can be used by first analysis module 423 to provide sentiment analysis according to an illustrative embodiment. In TD-LSTM for target-dependent sentiment classification, w stands for a word in a sentence whose length is n, {wl+1, wl+2, ..., wr−1} are target words, {w1, w2, ..., wl} are preceding context words, {wr, ..., wn−1, wn} are following context words.

Two LSTM neural networks, a left one $LSTM_L$, and a right one $LSTM_R$, are used to model the preceding contexts, as shown in FIG. 5. The input of $LSTM_L$ is the preceding contexts plus the target string, and the input of $LSTM_R$ is the following contexts plus the target string. $LSTM_L$ is executed from left to right, and $LSTM_R$ from right to left. This strategy is regarding the target string as the last unit that could better utilize the semantics of the target string when using the composing representation for sentiment classification. Next, the analysis concatenates the last hidden vectors of $LSTM_L$ and $LSTM_R$, and feeds them to a softmax layer to classify the sentiment polarity label. Averaging or summing the last hidden vectors of $LSTM_L$ and $LSTM_R$ can be used as alternatives.

The TD-LSTM network is trained end-to-end in a supervised learning framework. The loss function is the cross-entropy error of sentiment classification:

$$\text{loss} = -\sum_{s \in S} \sum_{c=1}^{C} P_c^g(s) \cdot \log(P_c(s))$$

where S is the training data, C is the number of sentiment categories, s means a sentence, Pc(s) is the probability of predicting s as class c given by the softmax layer, $P_c^g$ (s) indicates whether class c is the correct sentiment category, whose value is 1 or 0. The analysis takes the derivative of the loss function through back-propagation with respect to all parameters and updates parameters with stochastic gradient descent.

Consider the input sentence "I bought an ABC laptop and while the sound feature is great, the battery heats up in a short time" as an example. The representations of this sentence about sound features and battery heating are identical. This is problematic as the sentiment polarity labels towards these two targets are different. Thus, once sentiment polarity is identified, second analysis module 424 assesses the risk factor of the sentence as will now be explained.

In one illustrative embodiment, second analysis module 424 utilizes a Euclidean distance metric as part of a similarity analysis by taking new feature details and, using machine learning, identifies all features with similar configuration attributes. More particularly, a similar feature-to-feature matching engine uses a combination of a supervised learning algorithm referred to as K-Nearest Neighbor (KNN) and Euclidean distance, a distance similarity measure algorithm. KNN is a non-parametric, lazy learning algorithm which means the algorithm does not make any assumptions about the underlying data. This algorithm works on the basic premise that data points with similar classes are closer to each other. In other words, KNN makes its selection based on the proximity to the other data points regardless of what feature the numerical values represent.

This approach stores the entire dataset with all the demand attributes, including feature configuration and region information. When a new feature is passed for prediction for a similar feature, K-most similar records of feature from the feature data set to the returned feature record are located. From these neighboring datasets of features, a summarized prediction is made. The similarity can be measured in many ways, including a Manhattan distance, a Minkowski distance, or a Euclidean distance. In one illustrative embodiment, Euclidean distance is implemented because of its simplicity and accuracy.

Figure 6:
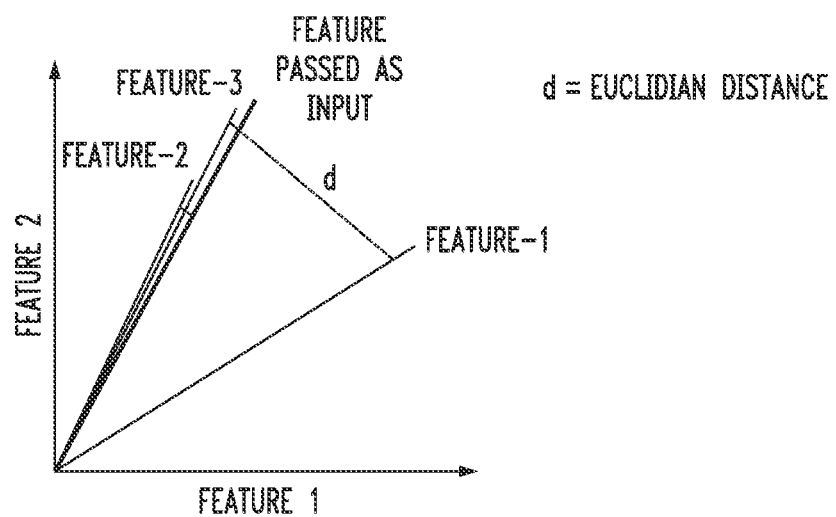
FIG. 6 illustrates a distance-based similarity computation for use in a multi-layer micro model analytics system according to an illustrative embodiment.

As a first step, categorical device attributes are encoded and then Euclidian distance between devices is calculated. Euclidean distance is the straight-line distance between two vectors or data points. Unlike cosine distance which uses the angle between two data points, Euclidean distance is easier to calculate by simply computing the square root of the sum of the squared differences between the two data points (vectors). The formula for the Euclidean distance algorithm is as follows: Euclidean Distance=sqrt(sum i to N (x1i−x2i) 2), where x1 is the first row of data, x2 is the second row of data, and i is the index to a specific column. FIG. 6 shows a diagram 600 of a Euclidean distance between various data set vectors.

With Euclidean distance, the smaller the value, the more similar are the two records. A zero distance means both the data points are exactly identical with all matching attributes and configurations. The following python code implements the computation of Euclidean distance between two data vectors:

```
# Calculate the Euclidean distance between two vectors
def euclidean_distance(featureData1, featureData2):
    distance = 0.0
    for i in range(len(featureData1)−1):
        distance += (featureData[i] − featureData2[i])**2
    return sqrt(distance)
```

Once the distance is calculated between the returned feature being passed to be matched and the features in the data set, it is ready to calculate the nearest neighbor matching.

Neighbors for the dataset being matched in the dataset are the K closest instances, as defined by the distance measure formula. To locate the neighbors for the feature dataset being compared within a dataset, the analysis first calculates the distance between each record in the dataset to the feature data being matched. This can be done using the distance function shown in FIG. 6.

Once distances are calculated, all the records in the training dataset are sorted or ordered by their distance to the data of the feature being matched. The top K datasets from the ordered list can then be returned as the most similar neighbors. This can be done by keeping track of the distance for each record in the dataset as a tuple, sorting the list of tuples by the distance (in descending order), and then retrieving the neighbors. The following Python code implements this function to return a K set of matching data points by nearest neighbor matching:

```
# Locate the most similar neighbors
def get_neighbors(demand_features, feature_to_match,
num_neighbors):
    distances = list( )
    for each_feature in demand_features:
        dist = euclidean_distance(feature_to_match, each_feature)
        distances.append((each_feature, dist))
    distances.sort(key=lambda tup: tup[1])
    neighbors = list( )
    for i in range(num_neighbors):
        neighbors.append(distances[i][0])
    return neighbors
```

K is the number of neighbors (num_neighbors) that can be tuned as part of a hyperparameter tuning to improve the performance of the model to return the most similar neighbors.

Once the model predicts the list of features (configured numbers as K value), these features are returned to the prediction engine for the NPI to team decide to move ahead with the new product.

Figure 7:
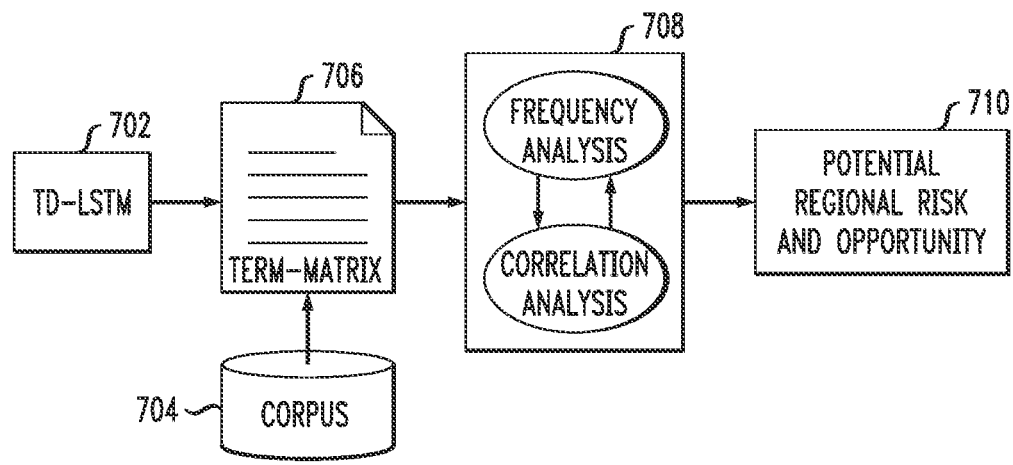
FIG. 7 illustrates a risk and opportunity analysis process for use in a multi-layer micro model analytics system according to an illustrative embodiment.

Second analysis module 424 is further configured to identify regional risk factors to consider while improving or maintaining global supply operations as depicted in a process 700 of FIG. 7.

As shown, text pre-processing using TD-LSTM (702) and results from the analysis are completed with the assistance of statistical programming. A corpus 704 is a collection of articles about global supply chain region-related risk built in a data store for text data pre-processing from TD-LSTM. Theses selected in the corpus are from global and regional journals. They are well-cited, and the content is highly related to global supply chain risk management. A corpus in text mining can have a variety of forms. After the corpus setup, the steps are performed to pre-process the content. Generally, there are many words in an article; however, not all of them are needed to study a specific interest. For example, some of the terms are used to polish the idea the authors hope to present to their readers. Therefore, pre-processing and extracting essential words is important while performing text mining using TD-LSTM. Furthermore, each word in the corpus is transformed into a word stems. According to the above data pre-processing, further text-mining analysis can proceed based on the improved corpus.

A document term-matrix 706 is generated after organizing and tuning the corpus. Each row represents a document within the corpus in this matrix, and each column represents a stemmed term that appears in the corpus. Term frequency (TF) can be calculated by computing the column sum. In block 708, frequency analysis is conducted by summing up the counts of each term and finding the most important terms. Correlations between words and phrases is also calculated in block 708 to explore the relationships between words. After frequency and correlation analysis among critical terms, global supply chain regional risk factors are categorized. Terms having high correlations with risk/opportunity are identified and output as 710.

Turning now to cognitive analytics module 410, in one or more illustrative embodiments, intent processing uses natural language understanding (NLU) and neural networks to analyze the dialog text and classify the intent.

Considering the dialog message is very similar to a time series model where the words come one after another in time/space, cognitive analytics module 410 utilizes a form of a Recurrent Neural Network (RNN). More particularly, to better understand the context and analyze the message efficiently, a bi-directional RNN (a special type) that uses two separate processing sequences, one from left to right and another from right to left, is used. As RNNs have the tendency to have to explode or vanish gradient issues for longer and more complex dialogs/messages, illustrative embodiments leverage a specific type of bi-directional RNN called bi-directional RNN with LSTM (Long short-term memory) for NLU module 413.

Figure 8:
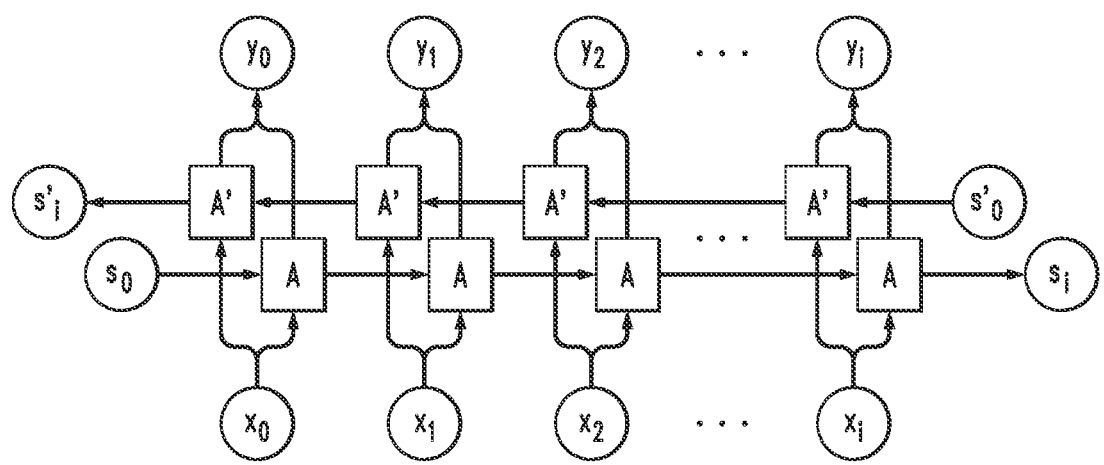
FIG. 8 illustrates an intent analysis network for use in a multi-layer micro model analytics system according to an illustrative embodiment.

RNNs are a special form of neural networks where the output from the previous step feeds into the input of the current step. In a traditional neural network, also called a feed-forward network, input and output are independent. In language processing, it is important to remember the previous words before predicting the next term of a sentence. RNN is particularly useful by having the hidden state that remembers some words in the sentence. If the sentences are too long, some of that previous information may not be available in the limited hidden state which causes a need for bi-directional processing of the sentence (from past and future in two sequences parallelly) as done in a bi-directional RNN, as illustratively used here. LSTM introduces advanced memory units and gates to an RNN, which improve the accuracy and performance of the model. A diagram of a bi-LSTM network 800 is shown in FIG. 8.

Figure 9:
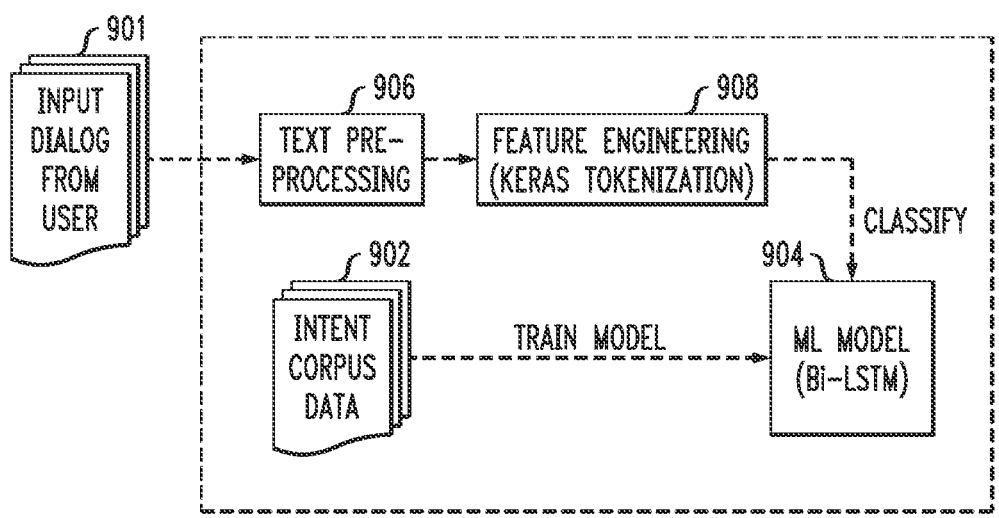
FIG. 9 illustrates a conversational intent analysis process for use in a multi-layer micro model analytics system according to an illustrative embodiment.

FIG. 9 illustrates a process 900 for conversational intent analysis that can be employed as an illustrative configuration for NLU module 413, speech analysis module 414, domain corpus 415, and intelligent intent processing engine 417 of cognitive analytics module 410.

An input user dialog 901 is received by process 900.

A set of intent corpus data 902 is used to train the bi-LSTM model 904. Intent corpus data 902 contains the words and phrases and the intent associated with each of the sentences used in training.

Upon receiving input user dialog 901, the data is pre-processed in text pre-processing module 906 to clean any unwanted characters and stop words. This step may also involve stemming and lemmatization and changing text to lower case, removing punctuation, removing flawed characters, etc.

Once pre-processing and data cleanup is done, the input list of words (in the sentence) is tokenized in feature engineering module 908. There are many approaches to tokenize these words, including a Keras library, an NLTK library, etc. In one illustrative embodiment, the Keras tokenizer class is used to index the tokens. After tokenization is done, the tokens are padded to make them of equal length so that they can be used in bi-LSTM model 904.

For output encoding, a similar procedure is performed (tokenization and padding) to the intent list in intent corpus data 902. At the end of this step, the list of intents is indexed and ready to be fed into bi-LSTM model 904. First, they need to be one-hot encoded before being fed to the model.

Thus, intent corpus data 902 is used to train bi-LSTM model 904 before predicting the intent for input user dialog 901. Bi-LSTM model 904 is created using the Keras library. Parameters are passed during the creation of the model, including an Adam optimizer, an activation function as Softmax, a number of epochs, etc. These parameters, especially batch size and epochs, are tuned to get the best performance and accuracy of the model. After the model is trained with the intent training data, is used to predict the intent of the dialog message. The accuracy of the model is calculated as well for hyperparameter tuning.

Figure 10:
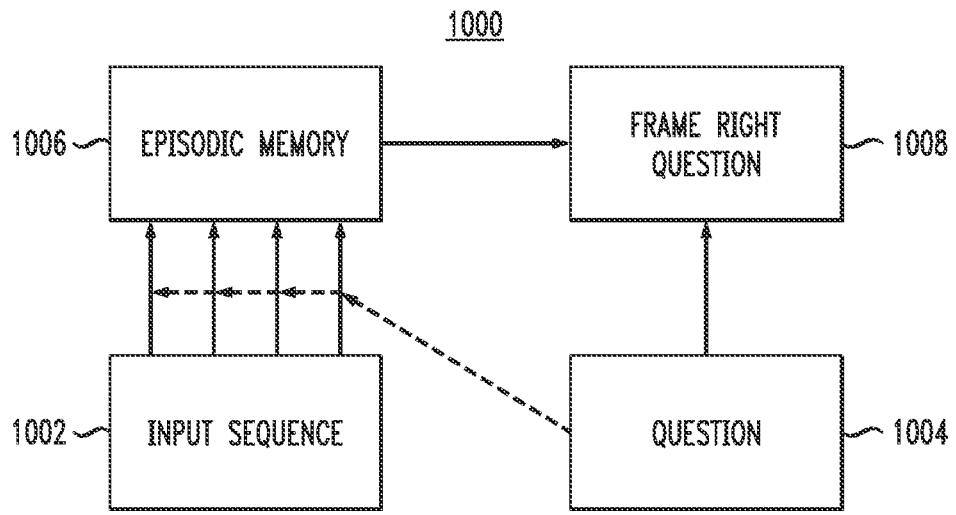
FIG. 10 illustrates a dynamic memory network engine for use in a multi-layer micro model analytics system according to an illustrative embodiment.

Turning now to dynamic memory network engine 430, which uses dynamic memory analysis 432, a dynamic memory analysis process 1000 according to an illustrative embodiment is depicted in FIG. 10.

Neural network architectures with memory and attention mechanisms exhibit certain reasoning capabilities required for question answering. One such architecture, the dynamic memory network (DMN), achieves high accuracy on various language tasks.

Most tasks in natural language processing can be cast into question answering (QA) problems over language input. The DMN is a neural network architecture that processes input sequences and questions, forms episodic memories, and generates relevant answers. Questions trigger an iterative attention process which allows the model to condition its attention on the inputs and the result of previous iterations. The DMN can be trained end-to-end and obtains state-of-the-art results on several types of intents and datasets.

The DMN first computes a representation for all inputs and the question. The question representation then triggers an iterative attention process that searches the inputs and retrieves relevant facts. The DMN memory module then reasons over retrieved facts and provides a vector representation of all information pertinent to an answer module that generates the answer.

Process 1000 shows a DMN implementation comprising an input module 1002, a question module 1004, an episodic memory module 1006, and a frame right question module 1008.

Input module 1002 encodes raw text inputs from the task into distributed vector representations. In natural language processing problems, the input is a sequence of TI words w1, . . . , wTI. One way to encode the input sequence is via a recurrent neural network.

In the cases where the input sequence is a single sentence, input module 1002 outputs the hidden states of the recurrent network. In the cases where the input sequence is a list of sentences, the sentences are concatenated into a long list of word tokens, inserting after each sentence an end-of-sentence token. The hidden states at each of the end-of-sentence tokens are then the final representations of input module 1002.

Like input module 1002, question module 1004 encodes the question of the task into a distributed vector representation. For example, in the case of question answering, the question may be a sentence such as" "What is the industry analysis of metaverse?" The representation is fed into episodic memory module 1006 and forms the basis, or initial state, upon which episodic memory module 1006 iterates.

Similar to the input sequence, the question is also most commonly given as a sequence of words in natural language processing problems. As before, the question is encoded via a recurrent neural network. Given a question of TQ words, hidden states for the question encoder at time t are provided by: $q_t = GRU(L[w Q t], q_{t-1})$, where L represents a word embedding matrix, and w Q t represents the word index of the t-th word in the question. Process 1000 shares the word embedding matrix across input and question modules 1002 and 1004. Unlike input module 1002, question module 1004 produces as output the final hidden state of the recurrent network encoder: $q = q_{TQ}$.

Given a collection of input representations, episodic memory module 1006 chooses which parts of the inputs to focus on through the attention mechanism. Episodic memory module 1006 then produces a "memory" vector representation taking into account the question as well as the previous memory. Each iteration provides the module with newly relevant information about the input. In other words, episodic memory module 1006 has the ability to retrieve new information in the form of input representations, which were thought to be irrelevant in previous iterations.

Episodic memory module 1006 iterates over representations outputted by input module 1002 while updating its internal episodic memory. In its general form, episodic memory module 1006 comprises an attention mechanism and a recurrent network with which it updates its memory. During each iteration, the attention mechanism attends over the fact representations c while taking into consideration the question representation q and the previous memory $m^{i-1}$ to produce an episode $e^i$. The episode is then used alongside the previous memories $m^{i-1}$, to update the episodic memory $m^i = GRU(e^i., m^{i-1})$. The initial state of this GRU is initialized to the question vector itself: $m^o. = q$. It is beneficial for episodic memory module 1006 to take multiple passes over the input for some tasks. After $T_M$ passes, the final memory $M^{TM}$ is given to frame right question module 1008.

Frame right question module 1008 generates a context-based question in a given vector. Depending on the type of task, frame right question module 1008 is either triggered once at the end of the episodic memory or at each time step. For example, attention gates are triggered by a specific question from the bAbI tasks gate values $g_t^i$ for corresponding vectors. The gates change with each search over inputs. Connections are not drawn for gates that are close to zero.

Episodic memory module 1006 then generates one or more optimal answers to the context-based question which are shown as intelligent response 440 in FIG. 4. Thus, in the metaverse question example mentioned above, intelligently framed to ask what technology area is the metaverse most likely to be developed for, at least in the short term, intelligent response 440 may indicate the gaming industry, by way of example only. The gaming industry answer comes from the real-time learning provided by multi-layer micro model analytics system 400.

Figure 11:
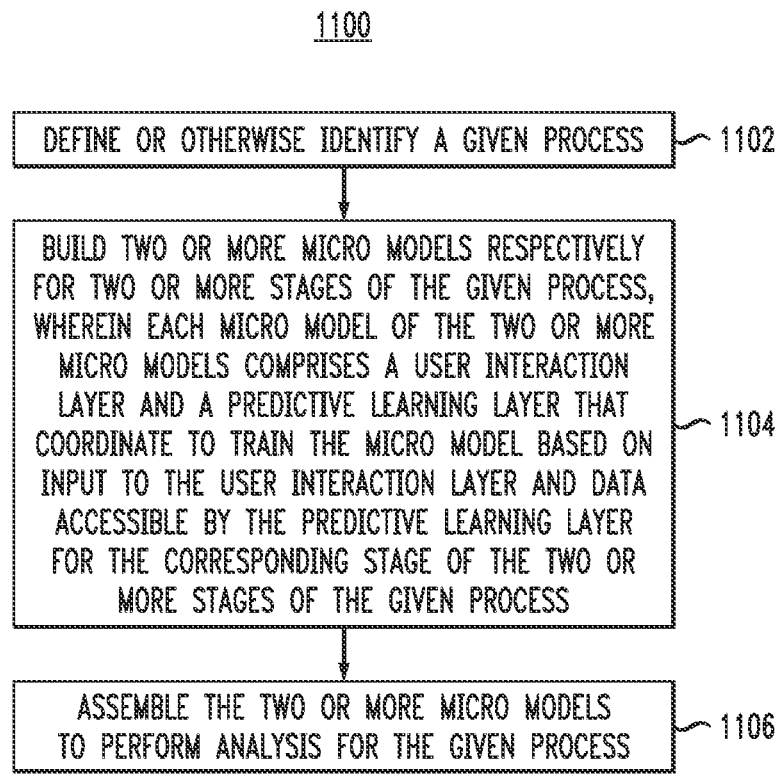
FIG. 11 illustrates a methodology for multi-layer micro model analytics according to an illustrative embodiment.

FIG. 11 illustrates a methodology 1100 for multi-layer micro model analytics according to an illustrative embodiment. In step 1102, methodology 1100 defines or otherwise identifies a given process. In step 1104, methodology 1100 builds two or more micro models respectively for two or more stages of the given process, wherein each micro model of the two or more micro models comprises a user interaction layer and a predictive learning layer that coordinate to train the micro model based on input to the user interaction layer and data accessible by the predictive learning layer for the corresponding stage of the two or more stages of the given process. In step 1106, methodology 1100 assembles the two or more micro models to perform analysis for the given process.

Illustrative embodiments are described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Cloud infrastructure can include private clouds, public clouds, and/or combinations of private/public clouds (hybrid clouds).

FIG. 12 illustrates a processing platform 1200 used to implement architectures/systems/processes/data 100 through 1100 depicted in FIGS. 1 through 11 respectively, according to an illustrative embodiment. More particularly, processing platform 1200 is a processing platform on which a computing environment with functionalities described herein can be implemented.

The processing platform 1200 in this embodiment comprises a plurality of processing devices, denoted 1202-1, 1202-2, 1202-3, . . . 1202-K, which communicate with one another over network(s) 1204. It is to be appreciated that the methodologies described herein may be executed in one such processing device 1202, or executed in a distributed manner across two or more such processing devices 1202. It is to be further appreciated that a server, a client device, a computing device or any other processing platform element may be viewed as an example of what is more generally referred to herein as a "processing device." As illustrated in FIG. 12, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 1202 shown in FIG. 12. The network(s) 1204 represent one or more communications networks that enable components to communicate and to transfer data therebetween, as well as to perform other functionalities described herein.

The processing device 1202-1 in the processing platform 1200 comprises a processor 1210 coupled to a memory 1212. The processor 1210 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1210. Memory 1212 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1212 may comprise electronic memory such as random-access memory (RAM), read-only memory (ROM) or other types of memory, in any combination. The one or more software programs when executed by a processing device such as the processing device 1202-1 causes the device to perform functions associated with one or more of the components/steps of system/methodologies in FIGS. 1 through 11. One skilled in the art would be readily able to implement such software given the teachings provided herein. Other examples of processor-readable storage media embodying embodiments of the invention may include, for example, optical or magnetic disks.

Processing device 1202-1 also includes network interface circuitry 1214, which is used to interface the device with the networks 1204 and other system components. Such circuitry may comprise conventional transceivers of a type well known in the art.

The other processing devices 1202 (1202-2, 1202-3, . . . 1202-K) of the processing platform 1200 are assumed to be configured in a manner similar to that shown for computing device 1202-1 in the figure.

The processing platform 1200 shown in FIG. 12 may comprise additional known components such as batch processing systems, parallel processing systems, physical machines, virtual machines, virtual switches, storage volumes, etc. Again, the particular processing platform shown in this figure is presented by way of example only, and the system shown as 1200 in FIG. 12 may include additional or alternative processing platforms, as well as numerous distinct processing platforms in any combination.

Also, numerous other arrangements of servers, clients, computers, storage devices or other components are possible in processing platform 1200. Such components can communicate with other elements of the processing platform 1200 over any type of network, such as a wide area network (WAN), a local area network (LAN), a satellite network, a telephone or cable network, or various portions or combinations of these and other types of networks.

Furthermore, it is to be appreciated that the processing platform 1200 of FIG. 12 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1200 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-12 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus, comprising:
a processing platform comprising at least one processor and at least one memory storing computer program instructions wherein, when the at least one processor executes the computer program instructions, the apparatus is configured to:
train a plurality of micro models respectively for each of a plurality of tasks, wherein the plurality of tasks collectively correspond to a stage of two or more stages of a given process, wherein each micro model of the plurality of micro models comprises a user interaction layer and a predictive learning layer that coordinate to train the micro model and a dynamic memory network engine comprising at least an episodic memory model, wherein the user interaction layer is trained based on input to the user interaction layer and wherein the predictive learning layer is trained based on data stored in one or more data sources accessible by the predictive learning layer for the respective task of the plurality of tasks of the corresponding stage of the two or more stages of the given process;
perform analysis on additional input to the user interaction layer using the trained user interaction layer and the trained predictive learning layer of each of the trained plurality of micro models for the respective task of the plurality of tasks for the corresponding stage of the two or more stages of the given process;
generate one or more recommendations and one or more details about the respective task for each of the trained plurality of micro models by inputting an output of the trained user interaction layer and an output of the trained predictive learning layer into the dynamic memory network engine;
perform analysis for the corresponding stage of the two or more stages of the given process by assembling the trained plurality of micro models for each of the plurality of tasks for the corresponding stage of the two or more stages of the given process, wherein at least micro model for at least one task of the plurality of tasks provides input for at least one other micro model for at least one other task of the plurality of tasks for each stage;
generate one or more recommendations and one or more details about the corresponding stage of the two or more stages of the given process based on the analysis of the assembled trained plurality of micro models for each of the plurality of tasks for the corresponding stage of the two or more stages of the given process; and
continuously trigger further training for the predictive learning layer of a given micro model of the plurality of micro models based on a rejection of the one or more recommendations about the respective task of the plurality of tasks of the corresponding stage of the two or more stages of the given process generated by the given micro model.

2. The apparatus of claim 1, wherein each of the user interaction layer and the predictive learning layer of each micro model comprises one or more machine learning algorithms configured to cooperatively train the micro model.

3. The apparatus of claim 1, wherein the user interaction layer comprises an intent analyzer configured to determine an intent from the input to the user interaction layer.

4. The apparatus of claim 3, wherein the intent analyzer is further configured to utilize natural language understanding and a machine learning model to analyze the input and classify the intent.

5. The apparatus of claim 4, wherein the machine learning model comprises a bi-directional recurrent neural network with long short-term memory.

6. The apparatus of claim 1, wherein the predictive learning layer comprises a sentiment analyzer configured to perform context-based opinion mining with respect to at least a relevant portion of the data accessible by the predictive learning layer.

7. The apparatus of claim 6, wherein the sentiment analyzer comprises a recurrent neural network with target dependent long short-term memory.

8. The apparatus of claim 6, wherein the sentiment analyzer derives a sentiment polarity for the relevant portion of the data.

9. The apparatus of claim 1, wherein the predictive learning layer comprises a similarity analyzer configured to match one or more features in the data accessible by the predictive learning layer.

10. The apparatus of claim 9, wherein the similarity analyzer is configured to use a distance metric-based algorithm to perform the matching.

11. The apparatus of claim 10, wherein the distance metric-based algorithm utilizes a Euclidean distance metric.

12. The apparatus of claim 1, wherein the predictive learning layer comprises an opportunity analyzer configured to determine one or more potential risks in the given process based on at least a portion of the data accessible by the predictive learning layer.

13. The apparatus of claim 12, wherein the opportunity analyzer executes one or more statistical programming algorithms to identify the one or more potential risks.

14. The apparatus of claim 1, wherein the user interaction layer and the predictive learning layer are operatively coupled by the dynamic memory network engine configured to generate a response to the input to the user interaction layer.

15. The apparatus of claim 14, wherein the dynamic memory network engine computes a representation for the input, performs an iterative attention process on the representation to retrieve relevant data, and reasons over at least a portion of the retrieved relevant data to generate the response.

16. The apparatus of claim 1, wherein the given process comprises a new product introduction process.

17. A method, comprising:
training a plurality of micro models respectively for each of a plurality of tasks, wherein the plurality of tasks collectively correspond to a stage of two or more stages of a given process, wherein each micro model of the plurality of micro models comprises a user interaction layer and a predictive learning layer that coordinate to train the micro model and a dynamic memory network engine comprising at least an episodic memory model, wherein the user interaction layer is trained based on input to the user interaction layer and wherein the predictive learning layer is trained based on data stored in one or more data sources accessible by the predictive learning layer for the respective task of the plurality of tasks of the corresponding stage of the two or more stages of the given process;
performing analysis on additional input to the user interaction layer using the trained user interaction layer and the trained predictive learning layer of each of the trained plurality of micro models for the respective task of the plurality of tasks for the corresponding stage of the two or more stages of the given process;
generating one or more recommendations and one or more details about the respective task for each of the trained plurality of micro models by inputting an output of the trained user interaction layer and an output of the trained predictive learning layer into the dynamic memory network engine;
performing analysis for the corresponding stage of the two or more stages of the given process by assembling the trained plurality of micro models for each of the plurality of tasks for the corresponding stage of the two or more stages of the given process, wherein at least micro model for at least one task of the plurality of tasks provides input for at least one other micro model for at least one other task of the plurality of tasks for each stage;
generating one or more recommendations and one or more details about the corresponding stage of the two or more stages of the given process based on the analysis of the assembled trained plurality of micro models for each of the plurality of tasks for the corresponding stage of the two or more stages of the given process; and
continuously trigger further training for the predictive learning layer of a given micro model of the plurality of micro models based on a rejection of the one or more recommendations about the respective task of the plurality of tasks of the corresponding stage of the two or more stages of the given process generated by the given micro model;
wherein the method is performed by a processing platform comprising at least one processor coupled to at least one memory executing program code.

18. The method of claim 17, wherein each of the user interaction layer and the predictive learning layer of each micro model comprises one or more machine learning algorithms configured to cooperatively train the micro model.

19. The method of claim 17, wherein the given process comprises a new product introduction process.

20. A computer program product stored on a non-transitory computer-readable medium and comprising machine executable instructions, the machine executable instructions, when executed, causing a processing device to perform steps of:
training a plurality of micro models respectively for each of a plurality of tasks, wherein the plurality of tasks collectively correspond to a stage of two or more stages of a given process, wherein each micro model of the plurality of micro models comprises a user interaction layer and a predictive learning layer that coordinate to train the micro model and a dynamic memory network engine comprising at least an episodic memory model, wherein the user interaction layer is trained based on input to the user interaction layer and wherein the predictive learning layer is trained based on data stored in one or more data sources accessible by the predictive learning layer for the respective task of the plurality of tasks of the corresponding stage of the two or more stages of the given process;
performing analysis on additional input to the user interaction layer using the trained user interaction layer and the trained predictive learning layer of each of the trained plurality of micro models for the respective task of the plurality of tasks for the corresponding stage of the two or more stages of the given process;
generating one or more recommendations and one or more details about the respective task for each of the trained plurality of micro models by inputting an output of the trained user interaction layer and an output of the trained predictive learning layer into the dynamic memory network engine;
performing analysis for the corresponding stage of the two or more stages of the given process by assembling the trained plurality of micro models for each of the plurality of tasks for the corresponding stage of the two or more stages of the given process, wherein at least micro model for at least one task of the plurality of tasks provides input for at least one other micro model for at least one other task of the plurality of tasks for each stage;
generating one or more recommendations and one or more details about the corresponding stage of the two or more stages of the given process based on the analysis of the assembled trained plurality of micro models for each of the plurality of tasks for the corresponding stage of the two or more stages of the given process; and
continuously trigger further training for the predictive learning layer of a given micro model of the plurality of micro models based on a rejection of the one or more recommendations about the respective task of the plurality of tasks of the corresponding stage of the two or more stages of the given process generated by the given micro model.

* * * * *